United States Patent [19]

Kane et al.

[11] Patent Number: 4,571,492

[45] Date of Patent: Feb. 18, 1986

[54] METHOD TO DETECT, IDENTIFY, AUTHENTICATE AND DATE AN ARTICLE

[76] Inventors: Noel S. Kane, 14611 Aloha Ave., Saratoga, Calif. 95070; Jack L. Robbins, Rte. 1, Box 41B, Brentwood, Calif. 94513; Melvin S. Coops, 1657 Third St., Livermore, Calif. 94550

[21] Appl. No.: 426,882

[22] Filed: Sep. 29, 1982

[51] Int. Cl.⁴ ................... G01T 1/161; G21H 5/02
[52] U.S. Cl. .................................................. 250/303
[58] Field of Search .................... 250/303, 271; 378/1

[56] References Cited

U.S. PATENT DOCUMENTS

| | | | |
|---|---|---|---|
| 2,474,271 | 6/1949 | Meyer | 250/303 |
| 3,295,651 | 1/1967 | Klackowski et al. | 250/303 |
| 3,390,849 | 7/1968 | Foster | 250/303 |
| 3,574,550 | 4/1971 | Scott et al. | 250/303 |
| 4,019,053 | 4/1977 | Levine | 250/303 |

Primary Examiner—Bruce C. Anderson
Attorney, Agent, or Firm—Paul Davis

[57] ABSTRACT

A method and apparatus for identifying an article and detecting its unauthorized movement comprises disposing a predetermined amount of radioactive isotopes on or within the article. The plurality of radioactive isotopes has a characteristic gamma spectrum unique to that plurality. Continuous monitoring is used to obtain a signal to detect unauthorized movement of the article. For identification purposes, means is provided for resolving the unique gamma spectrum into isotopic abundances. The plurality of radioactive isotopes is disposed on the article in an amount which preferably does not exceed an activity level of about one microcurie. Additionally, the half-life of the plurality is matched to the period of time needed to protect a particular article. These parameters make the method and apparatus particularly suitable for identifying and detecting unauthorized movement of articles that previously were impractical to detect, as well as providing the mechanism for authenticating and dating articles in such a manner so as not to encumber or visibly display the presence of the deposited plurality on an article.

8 Claims, 4 Drawing Figures

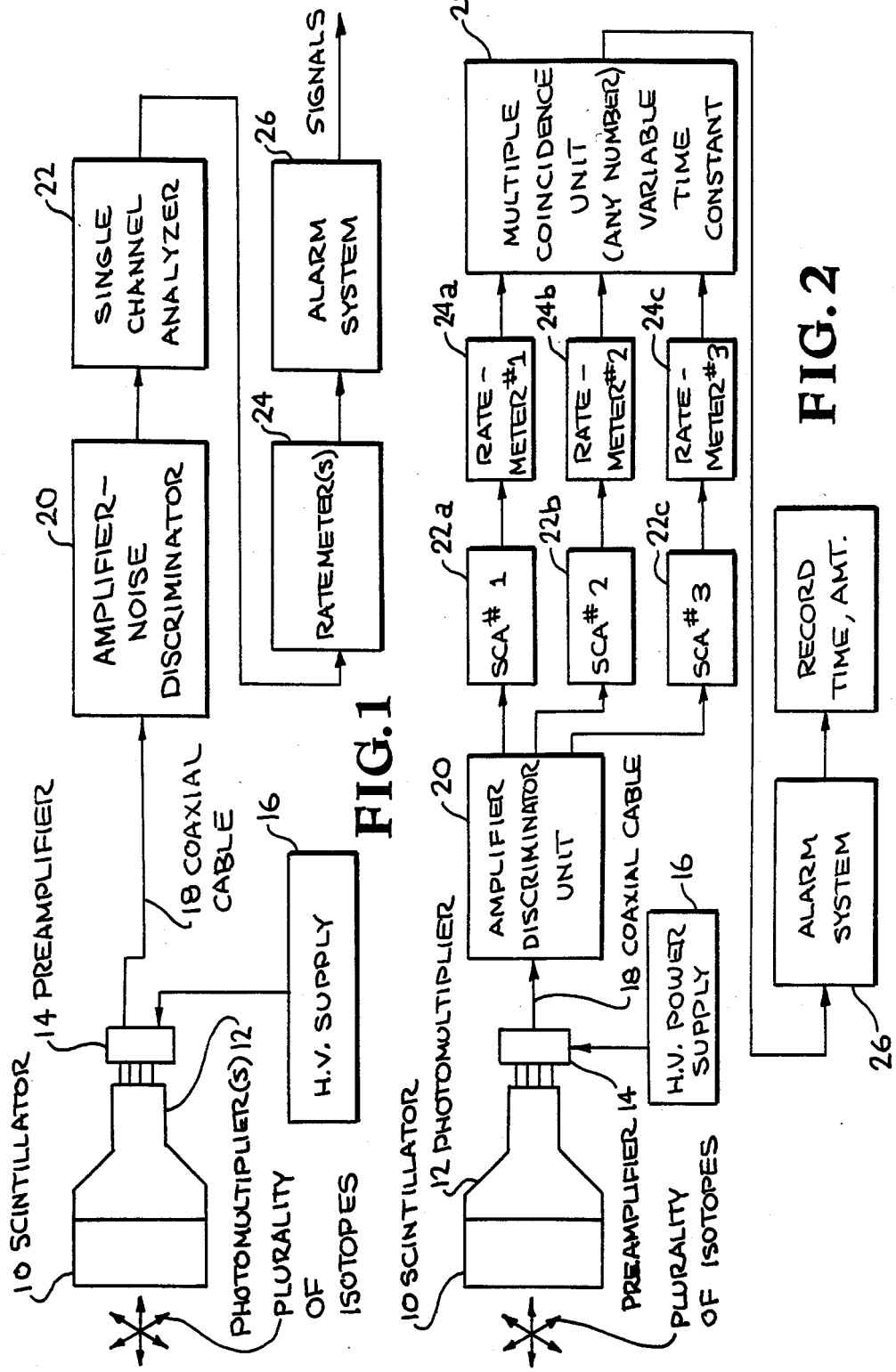

METHOD TO DETECT, IDENTIFY, AUTHENTICATE AND DATE AN ARTICLE

BACKGROUND OF THE INVENTION

This invention relates generally to a method and apparatus for detecting the movement and identification of an article. More particularly, the invention relates to a method and apparatus for detecting unauthorized movement and subsequent identification of an article by employing a plurality of radioactive isotopes disposed on or within the article.

Security and internal control systems for certain articles including, but not limited to, electronic and mechanical devices, documents, precious metals, oil and the like, are very limited in their effectiveness. Traditional alarm detectors used to monitor a given situation and provide the information required are typically inapplicable to the control and security of devices such as those recited above.

For example, conventional burglar alarms employ a metallic tape placed around windows and switches on doors. These devices have an electric current passing through them which actuates an alarm when interrupted. Devices of this nature are intended to prevent unauthorized entrance into buildings. Consider, however, a situation where an employee or customer who has authorization to enter the building seeks to remove articles therefrom without approval. An ordinary burglar alarm system will only detect the unauthorized entrance into a building and does not monitor or detect movement of individual articles within that building. As recited above, this system does not detect the movement of an article without the owner's permission.

A conventional theft detection system which employs electronic transmitters and receivers to detect unauthorized movement is disclosed in U.S. Pat. No. 4,274,090, dated June 16, 1981, to Cooper. This system is readily defeated by placing a minimal amount of thin, lightweight shielding material around the protection device, and hence offers limited protection. Additionally, the protection device is readily visible to the eye; sufficiently bulky as to encumber the appearance, handling and function; and/or induces an electronic interference in many articles such as commonly found in semiconductor devices.

Beyond detecting unauthorized movement of articles, another area of interest is the ability to identify and authenticate a true article from a bogus or counterfeit one. For example, the semiconductor industry has a serious problem with rejected and scrapped articles appearing in the marketplace. It is possible to obtain these rejected articles and apply a semiconductor company's name, logo, numbering system, etc. and misrepresent the articles as the ones of value. These bogus or counterfeit articles are impossible to tell from true ones without extensive electronic test equipment. Thus for many articles and specifically those listed above, not only is unauthorized movement arduous to detect, but identifying and authenticating the article is difficult.

Accordingly, it is desirable to provide a method and apparatus for detecting unauthorized movement of an article, as well as providing a means and method for identifying and authenticating same. It would be a further advancement to achieve the preceding as well as pinpointing the date of manufacture of the article. Of particular significance is to achieve the above for either very small articles, or those having high monetary value. Additionally, it would be an advancement to detect unauthorized movement of articles without employing bulky electronic devices which can readily be rendered ineffective by employing a minimum amount of thin, lightweight shielding material.

SUMMARY OF THE INVENTION

Accordingly, an object of the invention is to provide a method and apparatus for detecting the unauthorized movement of an article.

Another object of the invention is to provide a method and apparatus for detecting unauthorized movement of an article as well as providing a means for identifying the article.

Yet another object of the invention is to provide a method and apparatus for detecting unauthorized movement of an article as well as identifying it as being authentic by a means which cannot be readily defeated.

A further object of the invention is provide a method and apparatus for identifying an article as being authentic to a particular manufacturer or owner as well as detecting its unauthorized movement.

Yet another object of the invention is to provide a method and apparatus for identifying an article, detecting its unauthorized movement, and pinpointing its date of manufacture.

A further object of the invention is to provide a method and apparatus to detect unauthorized movement, identify, authenticate and date an article in such a manner so as to be inconspicuous.

Additional objects, advantages and novel features of the invention will be set forth in part in the description which follows, and in part will become apparent to those skilled in the art upon examination of the following, or may be learned by practice of the invention. The objects and advantages of the invention may be realized and obtained by means of instrumentation in combinations specifically pointed out in the appended claims. To achieve the above objects, the apparatus for detecting unauthorized movement of an article comprises a predetermined amount of a plurality of radioactive isotopes disposed on or within the article. The plurality of radioactive isotopes is made to have an identifiable characteristic gamma spectrum which is unique to that particular plurality. Also included is a means for detecting the gamma spectra. The monitoring device detects gamma or neutron emission which indicates close proximity of the article, and administrative control of this monitoring device determines unauthorized movement. In a further aspect of the present invention, an apparatus for identifying an article is disclosed.

In yet another aspect of the invention, a method for detecting close proximity of an article comprises disposing a predetermined amount of a plurality of radioactive isotopes on or within the article. The plurality of radioactive isotopes is chosen as having an identifiable characteristic gamma spectrum unique to that plurality. Means for detecting this characteristic gamma spectrum is provided, and the detector continuously monitors radioactive emissions and thereby detects movement. Thereafter, a characteristic gamma spectrum is detected in response to the unauthorized movement. In a further aspect of the present invention, a method for identifying an article comprises disposing a predetermined amount of a plurality of radioactive isotopes on the article. Again, the plurality of radioactive isotopes is chosen as having a characteristic identifiable gamma spectrum unique to that plurality. Means is provided for detecting gamma spectra. Thereafter, the article is identified by actually detecting and evaluating the gamma spectra.

Use of a plurality of radioactive isotopes disposed on an article achieves multiple purposes: the total radioactivity from the plurality provides a level of activity which is detectable; the assignment of specific radioactive isotopes, or combinations thereof, provides a specific and special gamma spectrum which can be assigned to a product or user; and, the plurality provides a method for determining authenticity, specifically by the unique gamma spectrum which is analogous to the tumblers found in the cylinder lock. In this way it is possible to make highly sophisticated one-of-a-kind combinations for each user that are almost impossible to duplicate, much like a human fingerprint.

Another advantage of invention is the ability to establish the date when an article was manufactured, more particularly, to establish the date when the plurality of radioisotopes was deposited on the article. By knowing the ratio of the various isotope abundances at two different times, the age of the deposit can be established.

For particular applications, the plurality of radioactive isotopes is chosen to meet each article's circumstance and detection time-frame. That is, a lesser amount of radioactivity is deposited on an article which is packaged with a large number of similar articles. For other purposes, e.g., a negotiable security or the like, which is not packaged in large numbers, a greater amount of radioactivity would be deposited on the article. Thus, the amount of radioactivity required to be deposited on the article is dependent on many factors, including the number of units to be packaged, and the length of time identification and/or authentication of the article that is desired. A common goal for all applications of the present invention is to keep radiation exposures to both the manufacturing employees and general public to a minimum value that is within all local, state, federal, and international radiation protection standards.

DESCRIPTION OF THE DRAWINGS

The accompanying drawings which are incorporated in and form a part of the specification illustrate various embodiments of the present invention, and, together with the description, serve to explain the principles of the invention.

FIG. 1 is one embodiment illustrating a schematic block diagram of an apparatus for detecting unauthorized movement of an article.

FIG. 2 is a schematic block diagram of a second embodiment of an apparatus for detecting movement of an article employing a multiple-gamma-peak-coincidence system.

DETAILED DESCRIPTION

Figure 3:
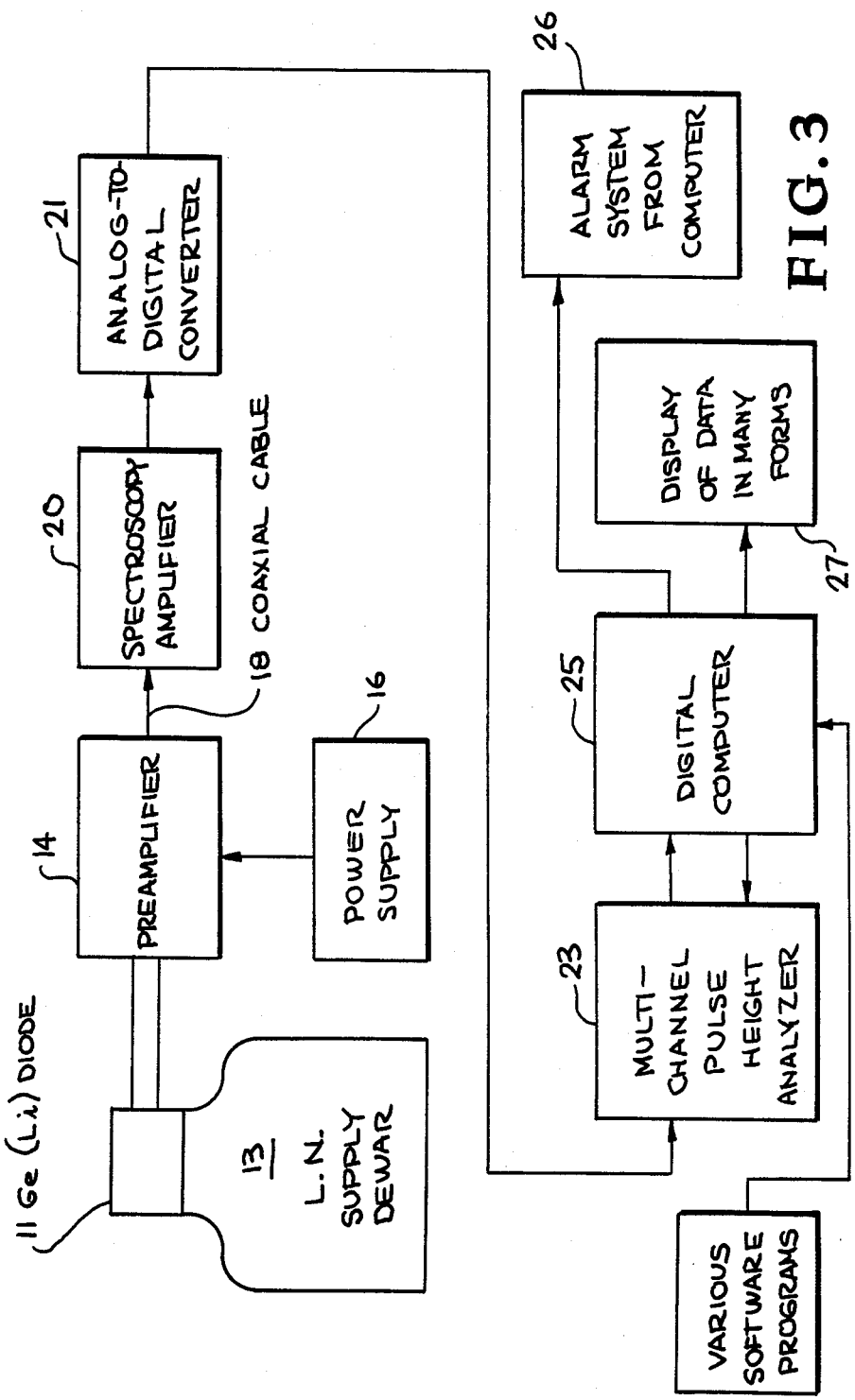
FIG. 3 is a schematic block diagram of a third embodiment of an appartus for detecting unauthorized movement of an article employing a multi-channel pulse height analyzer.

The method for detecting unauthorized movement of an article of the present invention comprises disposing a predetermined amount of a plurality of radioactive isotopes on or within the article. The plurality of radioactive isotopes is chosen as having an identifiable characteristic gamma spectrum which is unique to that plurality. For a particular application or user, each plurality of radioactive isotopes is different. Means is provided for detecting characteristic gamma spectra emitted by radioactive isotopes. The detection instrument generates a discernible signal by sensing specific radiation emitted by selected radioactive isotopes. Administrative response to the detector signal leads to the detection of unauthorized movement of the article. Thereafter, the characteristic gamma spectrum is used to identify, authenticate and date the article.

As used throughout this disclosure, unauthorized movement is defined as the detection of the proximity of an article bearing radioactive isotopes emitting characteristic gamma spectra, by use of a specialized radiation sensing instrument coupled with administrative controls.

Plurality is defined as two or more radioactive isotopes which together emit an identifiable discernable gamma spectrum.

Identification is defined as the detection of a specific radioactive isotope, or combination of radioisotopes, by identifying a unique gamma spectrum in contrast to a natural radiation background or other sources of radioactivity that may be present.

Authentication is defined as the measurement of the characteristic gamma spectral distribution emitted by selected radioactive isotopes, and determination of the gamma line intensities for those isotopes, thereby defining the abundances of specific isotopes present in the radioactive deposit.

Not readily defeated is defined to mean the quantity of shielding material required would be so uncommonly bulky or heavy that its presence would come to the attention of a casual observer.

The method for identifying an article of the present invention comprises disposing a predetermined amount of a plurality of radioactive isotopes on or in that article as outlined above. The plurality has an identifiable characteristic gamma spectrum. Means is provided for detecting the gamma spectrum as previously disclosed, and thereafter the gamma spectrum is observed.

The method for authenticating an article comprises dispersing a predetermined amount of a plurality of radioisotopes on the article. The plurality has an identifiable characteristic gamma spectrum and gamma line intensities which are unique to the plurality. Means are provided for observing the gamma line intensities of the plurality. Thereafter, the gamma line intensities of specific gamma rays in the plurality are observed, and the abundances of specific isotopes of the plurality determined.

Articles suitable for the method and apparatus of the present invention include, but are not limited to, wood, paper, valued metal, precious stones and gems, valued fluids such as oil, manmade and natural fabrics and cloth, porcelain, plastic, ceramic, mechanical and electronic devices and components thereof. Paper articles further include negotiable stocks, bonds, securities and other instruments of trade, blueprints, schematics, proprietary and trade secret documents, technical manuals, confidential and private papers and the like. Precious metals further include gold, silver, platinum, and other rare metals, including articles containing materials such as thermocouples, printed circuit boards and the like. Table I is a list of exemplary electronic components.

TABLE I

| Product Line Components | Sub Products |
|---|---|
| Analog | Amplifiers, Voltage Regulators & References, Data Conversion Circuits, Interface, Special Consumer Circuits, Other Linear (including Comparators) |
| Digital Bipolar | TTL-Schottky Logic, TTL-Standard Logic, ECL Logic, Other Logic, Bipolar RAM (read/write), Other Bipolar Memory |
| Digital MOS Logic | MPU & Peripheral Circuits, Other MOS Logic |
| Digital MOS Memory | MOS RAM (read/write), Other MOS Memory |
| Digital CMOS | MPU and Peripheral Circuits, Other CMOS Logic, CMOS RAM (read/write), Other CMOS Memory |
| Diodes | Small Signal Junction Diodes, Voltage Reference & Regulator Diodes |
| Small Signal Transistors | Bipolar Small Signal Transistors, Field Effect Transistors |
| Power Transistors | RF and Microwave Power Transistors, General Purpose Power Transistors |
| Rectifiers (Pwr. Diodes) | 0.5–3.0 Amps, 3.1–35.0 Amps, above 35 Amps |
| Thyristors | 0–55 Amps, Above 55 Amps |
| Optoelectronics | Displays, Lamps, Couplers, Other Optoelectronics |
| All Other Discrete | Microwave Diodes, All Other Discrete |

Any number of radioactive isotopes can be employed for purposes of the present invention. It is possible to mix gamma spectra of several radioactive isotopes to form a special spectral distribution analogous to the tumblers of a cylinder lock. For purposes of the present invention, individual isotopes which make up the plurality are either gamma or neutron emitters. However, the plurality as a whole must emit a characteristic gamma spectrum. Suitable radioactive istopes include but are not limited to those listed in Table II. Preferred individual radioactive isotopes include but are not limited to, $^{51}$Cr, $^{85}$Sr, $^{113}$Sn, $^{139}$Ce, $^{22}$Na, $^{57}$Ni, and $^{252}$Cf. All the preceding isotopes are gamma emitters, except that $^{252}$Cf is also a neutron emitter.

TABLE II

| Isotope | Half-Life $T_{\frac{1}{2}}$ | Decay Mode | Gammas (keV) |
|---|---|---|---|
| Barium-133 | 10.7 yr | EC | 356, 81 |
| Cerium-139 | 137.0 da | EC | 166 |
| Chromium-51 | 27.0 da | EC | 320 |
| Cobalt-56 | 78.0 da | EC, $\beta+$ | (511), 1378 |
| Cobalt-57 | 271.0 da | EC | 122, 14, 136 |
| Hafnium-175 | 70.0 da | EC | 343 |
| Iridium-192 | 74.0 da | $\beta-$ | 316, 468 |
| Iron-59 | 45.0 da | $\beta-$ | 1100, 1292 |
| Mercury-203 | 46.0 da | $\beta-$ | 280 |
| Scandium-46 | 84.0 da | EC | 890 |
| Selenium-75 | 120.0 da | EC | 264, 136 |
| Sodium-22 | 2.6 yr | $\beta+$ | (511), 1275 |
| Strontium-85 | 65.0 da | EC | 514 |
| Strontium-89 | 50.0 da | $\beta-$ | 909 |
| Tin-113 | 115.0 da | EC | 392 |
| Tungsten-185 | 75.0 da | $\beta-$ | 125 |
| Ytterbium-169 | 32.0 da | EC | 63, 197, 109 |
| Yttrium-88 | 106.0 da | EC, $\beta+$ | 184, 898 |
| Yttrium-91 | 59.0 da | $\beta-$ | 1205 |
| Zirconium-95 | 64.0 da | $\beta-$ | 756, 724, 235 |
| Lanthanum-140 | 40.0 hr | $\beta-$ | 1600, 487 |
| Rubidium-86 | 18.0 da | $\beta-$ | 1076 |
| Technicium-99 m | 6.0 hr | IT | 143 |
| Nickel-57 | 36.0 hr | EC | 127, 511, 1377, 1919 |
| Platinum-193 m | 4.3 da | EC | many from 77 to 624 |
| Lead-203 | 52.0 hr | EC | 279 |
| Californium-252 | 2.64 yr | $\beta, \gamma, SF$ | 43.40, 100.2, 160> 6 MeV SF - numerous |

The unique energy levels and half lives of radioactive isotopes provide an almost infinite number of suitable radioactive isotopes applicable to the invention. Using these characteristics to the best advantage of the invention, it is possible to provide custom and unique protection periods of time after which the radioactivity decays to negligible levels. In many cases of detection, there must be sufficient radioactivity so as to be detected at normal walk-through rates by the detection apparatus. In other cases longer counting times and more sophisticated detectors are employed; therefore the levels of radioactive isotopes required for these purposes is less.

Hence the amount of radioactivity disposed on or in an article is directly correlated to the purpose, function and desired time-frame for detection, identification, authentication and/or dating of that article. Preferably the total radioactivity disposed on any one article is one microcurie or less. More preferably, the level of radioactivity initially disposed on or within the article is 0.5 microcurie or less.

Unauthorized transfer of small, mass-produced articles such as those found in a semiconductor industry, can be detected by depositing a relatively small quantity of the plurality of radioactive isotopes, e.g., less than 0.5 microcurie, on each individual article. Movement of personnel and hardware within a manufacturing facility is restricted to hallways which are continuously monitored for the presence of the particular plurality which is disposed on the articles. This method is highly effective for the control of pilferage while utilizing minimal amounts of radioactive materials. Additionally, if short half life isotopes are used, the total radiation being emitted at any time can be held at some fixed value; the radioactive emission from the articles decays away at the same rate that new radioactive material is added to the production line. By utilizing this approach, radiation exposure to the general public as well as to the manufacturing employees, is held to a minimum practical level while accomplishing the objective of effective control of mass-produced, high-value items, or items of security interest to the manufacturer.

In practice, the plurality is selected to meet the particular requirements of a component production sequence. The half life is chosen to approximately match the period of time required for production, testing and packaging for shipment of a typical batch of articles that are produced on the assembly line. If the final packaging process includes grouping a number of identical single items into a larger aggregate batch, it is possible to use several isotopes of differing half-lives and radiation intensity, i.e., if the individual items are handled separately for one day and then grouped into a batch of 100 identical units which are stored for one month prior to final shipment, one can utilize two different isotopes for pilferage control; a first isotope with a very short half life in an amount adequate to trip the radiation monitoring device on a single item basis for one or two days, and a second isotope having a longer half life in a greatly reduced amount (per article) but which as an aggregate trips the detection apparatus.

This two-tier monitoring approach reduces personal exposure to a minimum level while maintaining adequate detectability for the controlled items at any time during the production sequence. Thus for certain applications the majority of the radioactivity initially disposed on the article will have a shorter half life than the remaining minority.

Use of a plurality of isotopes having a characteristic gamma spectrum can be employed in conjunction with documents or other articles to be protected for extended periods of time ranging to many years. In this situation, the plurality is adjusted to provide detection, identification, authentication and dating of a duration longer than may be necessary for articles such as mass produced items. These include, but are not limited to, $^{51}$Cr for detection and identification and $^{139}$Ce, together with $^{22}$Na, for authentication and dating purposes.

The plurality of radioactive isotopes can be disposed in a valuable fluid. In this way, movement of the fluid can be detected. Of particular importance is crude oil. Pilferage of crude oil can be minimized by metering the plurality of radioactive isotopes into the crude oil at its source. The plurality is chosen to closely match production and/or pipe line transit time-frames. Many metallo-organic compounds exist that are soluble in crude, and these compounds can then be the source of the individual isotopes which comprise the plurality. These include but are not limited to $C_4H_4SCr(CO)_3$ as a source of $^{51}$Cr, $(C_5H_5NiCO)_2$ as a source for $^{57}$Ni, $(CH_3)_4Pt$ as a source for $^{193}$Pt, and $(C_2H_5)_4Pb$ as source for $^{203}$Pb.

The plurality can be utilized to pinpoint the date of manufacture of an article, e.g., the date the plurality was initially disposed on the article. It is not necessary to know the absolute amount of each individual isotope in the plurality; what is significant is the ratio of the gamma lines (characteristic gamma energy intensity) in each gamma spectrum, at two different times. Isotope abundances are determined with a precision gamma spectrometer, a precise instrument utilizing a lithium-drifted germanium crystal as a detector, and the observed data is recorded digitally in a multi-channel pulse height analyzer. The recorded spectrum, which is unique to a particular plurality at a specific time, can be resolved to obtain isotope abundance information by mathematical analysis of the spectral data.

The mathematical law governing the decay of any radioactive species is $$A = A_o e^{-\lambda t}$$

where $A_o$ = the radioactive intensity at time zero, $A$ = the radioactive intensity after time "t"0 has elapsed, t = the elapsed time during which radioactive decay takes place $\lambda$ = natural logarithm of 2.0, divided by the half-life of the isotope measured in the same time units as is used for "t" in the preceding definition.

For the case of radioactive decay of two different isotopes A and B with different half lives the following relationship exists:

$$A = A_o e^{-\lambda_a t}$$

and $$B = B_o e^{-\lambda_b t}$$

At any time, t, the following exact mathematical relationship exists between isotopes A and B:

$$t = \frac{\ln\left(\frac{A}{B}\right) + \ln\left(\frac{B_o}{A_o}\right)}{(\lambda_b - \lambda_a)}$$

where ln = natural logarithm Therefore the elapsed time can be calculated by determining the radioactivity ratios ($A_o/B_o$) initially and (A/B) after elapsed time, t, and mathematically solving the above equation.

For purposes of identifying an article, the plurality of isotopes can vary, or the concentration of the various isotopes included within the plurality can be modified. Thus it is possible to employ the same plurality for a number of manufacturers. Each manufacturer can have a unique plurality in that the concentration of one or more of the individual isotopes included within the plurality is varied and thus yields a distinct gamma spectrum.

A schematic diagram of one apparatus to detect unauthorized movement of an article is shown in FIG. 1. Included is a scintillator 10, at least one photomultiplier 12, one preamplifier 14 for each photomultiplier, a high voltage supply 16 operatively connected to each preamplifier 14 (approximately 1,000 V, 50 ma), a coaxial cable 18 which operatively connects the preamplifiers to an amplifier 20, a single channel amplifier 22 which is operatively connected to amplifier 20 and a rate meter 24, and an alarm system 26 which is operatively connected to rate meter 24.

This scintillation device (as shown in FIG. 1) detects the emitted gamma rays from the radioactive source, and the associated electronic equipment determines both the isotopic composition and amount of the individual isotopes comprising the plurality. The spectra is made to be unique, compared to other sources, by carefully varying the isotopic composition of the plurality. This results in varying intensities of the characteristic gamma lines but does not change the energy spacing between the lines chosen for the specific application. The code for any given plurality is determined by the original isotopic ratios chosen and the decay time since the mixture was originally characterized.

Devices used for gamma ray detection include, but are not limited to: gas-filled counting tubes (proportional counters); liquid and plastic scintillators; thallium-activated sodium iodide crystals, semiconductor diodes (lithium-drifted germanium or lithium-drifted silicon crystals); gallium arsenide crystals, and the like. These detectors interact with gamma rays to provide either an emitted photon suitable for electronic amplification or an electrical change in the detector that results in a very fast change in the electrical resistance (or transmission) characteristics of the gas mixture or semiconductor material. This transient change provides a rapidly rising electronic pulse proportional to the energy of the interacting gamma ray, and constitutes a suitable signal for further amplification.

Referring again to FIG. 1, photomultiplier 12 is used to convert the photon to an electrical pulse. After amplification within the photomultiplier, the electrical signal is sufficiently large to drive preamplifier 14 which in turn is designed to drive a coaxial transmission cable 18 of any reasonable length.

If a semiconductor detector is used, a high-gain low-noise preamplifier 14 is directly attached to the diode to obtain sufficient amplification to again drive coaxial cable 18.

The signals obtained from preamplifier 14 are transmitted by coaxial cable 18 to an electronics control area where the signal is further amplified, chopped, shaped, and fed to additional signal processing equipment. This includes amplifier 20, and at least one single channel amplifier 22 which is gated to accepted only a single energy slice, i.e., a single gamma ray line, where each single channel analyzer drives a ratemeter 24, which in turn is operatively connected to alarm system 26. This embodiment is useful for single gamma peak detection.

FIG. 2 illustrates a second embodiment of an apparatus useful in detecting unauthorized movement of an article. As shown, three single channel amplifiers 22a, 22b and 22c are operatively connected to amplifier 20 and rate meters 24a, 24b, and 24c, respectively. The three rate meter signals are combined by means of a coincidence or addition unit 25. This unit determines the average ratio of the incoming single channel amplifier signals and can be programmed to determine if the intensity of the signals is in any predetermined ratio. In this way, one can preprogram a "combination" to pass a valid alarm signal while rejecting all extraneous signals or "noise" that may come from other radioactive sources. The coincidence unit is operatively connected to alarm system 26. This embodiment is useful for multiple gamma peak detection and monitors several isotopes simultaneously.

Referring now to FIG. 3, a third embodiment of an apparatus for detecting unauthorized movement of an article is illustrated. In this embodiment, a chilled Ge(Li) diode detector 11 is employed in conjunction with a liquid nitrogen supply dewar 13. A preamplifier 14 is included as is a power supply 16 and a coaxial line 18. In this embodiment, all incoming signals are fed to a spectroscopy amplifier 20 which is operatively connected to an analog-to-digital converter 21. A multi-channel pulse height analyzer 23 is operatively connected to analog-to-digital converter 21 and to a digital computer 25. Incoming signals are stored in the memory bank (not shown) of multi-channel pulse height analyzer 23 for occasional interrogation of the gamma lines of interest. The pulse height analyzer is interfaced with the digital computer to allow the incoming gamma signals to be converted into isotopes present, and their relative abundances. The digital computer is operatively connected to a display unit 27 and an alarm system 26.

The plurality of radioisotopes is disposed either on an external surface of the article, or alternatively, is disposed as an integral part of the article itself. For example, if an electrical component such as an integrated circuit is the article to be protected, the plurality of radioisotopes can be an integral part of the component itself. In the case of oil, the isotopes are merely disposed within the liquid itself. In one embodiment of the invention, the plurality of radioisotopes is disposed in a marking medium which can be applied to the article. That is, the manufacturer of the article can integrate the plurality of radioisotopes within the identifying medium such as ink which is affixed to the article.

For this purpose, the plurality of radioisotopes can be disposed in a variety of substances commonly found in inking materials, including but not limited to pigment, drawing agents, waxes, antioxidants, lubricants, surface tension agents, starch, and the like. Suitable pigments include carbon black, titanium dioxide, zinc sulfide, zinc oxide, aluminum hydrate having a formula of $5Al_2O_3 \cdot 2SO_3 \cdot XH_2O$, magnesium carbonate, calcium carbonate, precipitated barium sulfate, lead sulfate, clay, lead chromate, mercury sulfite, and the like. Suitable waxes include dispersions of polyethylene, hydrocarbon waxes, vegetable and animal waxes. The plurality of radioisotopes can be mixed with polyester or other synthetic resins dissolved in glycols and/or esters. Additionally, the plurality can be incorporated in a clear agent such as water which is subsequently vaporized from the article. Each isotope of a plurality can be present in any chemically suitable form, i.e., in the nature of any number of chemical compounds.

The following examples are meant to exemplify certain embodiments of the invention and are not to be regarded as limiting its scope which is defined in the appended claims.

EXAMPLE 1

A bank teller is directed at gun-point to transfer all cash available to a hold-up man. The teller dips her finger into a weak radioactive solution containing at least two radioactive tracer isotopes of different half life, and in handling the cash, deposits a small amount of the radioactive mixture on many of the bills. The robber makes a clean escape but is apprehended several months later for a totally different crime. Some large bills are found in his possession.

Immediately after the bank hold-up, the radioactive tracer solution at the teller's window is analyzed in a precision gamma spectrometer and several radioactive isotopes are unambiguously identified, the half lives are obtained from the scientific literature, and the ratio $(A_o/B_o)$ determined. This ratio is normalized to $(T_o)$, the actual time of the robbery.

The bills in the robber's possession are checked with a simple radiation detector and found to be slightly radioactive. Subsequently they are submitted to precision gamma spectrometer analysis. The data obtained shows the same radioactive isotopes present as were in the solution in the teller's cage. The robber says he works in a nuclear plant and the radiation must be from the work place. However, the gamma spectrometer data is interrogated for the ratio (A/B) and from this data, and the information obtained from the analysis of the solution in the teller's cage, it can be unequivocally shown that (t), the elapsed time between the two analyses, matches the date between the robbery and the apprehension of the criminal exactly. There can be no doubt whatever as to the history of the radioactively traced bills; the evidence is unrefutable.

The plurality of radioisotopes used in this example is 0.1 $\mu$Ci of $^{51}CR(T_{1/2}=27$ days), 0.01 $\mu$Ci of $^{139}Ce(T_{1/2}=137$ days) and 0.001 $\mu$Ci of $^{22}Na(T_{1/2}=2.6$ years).

EXAMPLE 2

The high technology industry is based on the competitive advantage afforded by large research and development programs. These research and development programs are costly and, hence, nearly all documents, associated with these programs, have great value.

The very keen competitive nature of the high technology industry requires the best possible security measures be taken to insure these R&D documents remain proprietary. Unfortunately the usual security efforts employed to control such documents has proven ineffective. Many R&D documents find their way to a competitor who gains advancements that would otherwise not be readily available.

To more closely control documents a plurality of radioactive isotopes can be disposed upon them in either visible or invisible marking agents. It is then possible to detect the gamma or neutron emission even if the documents were concealed on someone's person or in personal effects such as briefcase, purse, portfolio, and the like.

The following plurality of radioisotopes is disposed on a document: 0.1 $\mu$Ci of $^{51}$Cr, 0.01 $\mu$Ci of $^{139}$Ce and 0.001 $\mu$Ci of $^{22}$Na. Not only can movement of the document be detected but also the document can be authenticated and dated by use of this plurality. The useful protection time with this plurality is on the order of 10 to 15 years. Longer protection times can be guaranteed by the addition of longer half-life isotopes.

EXAMPLE 3

Figure 4:
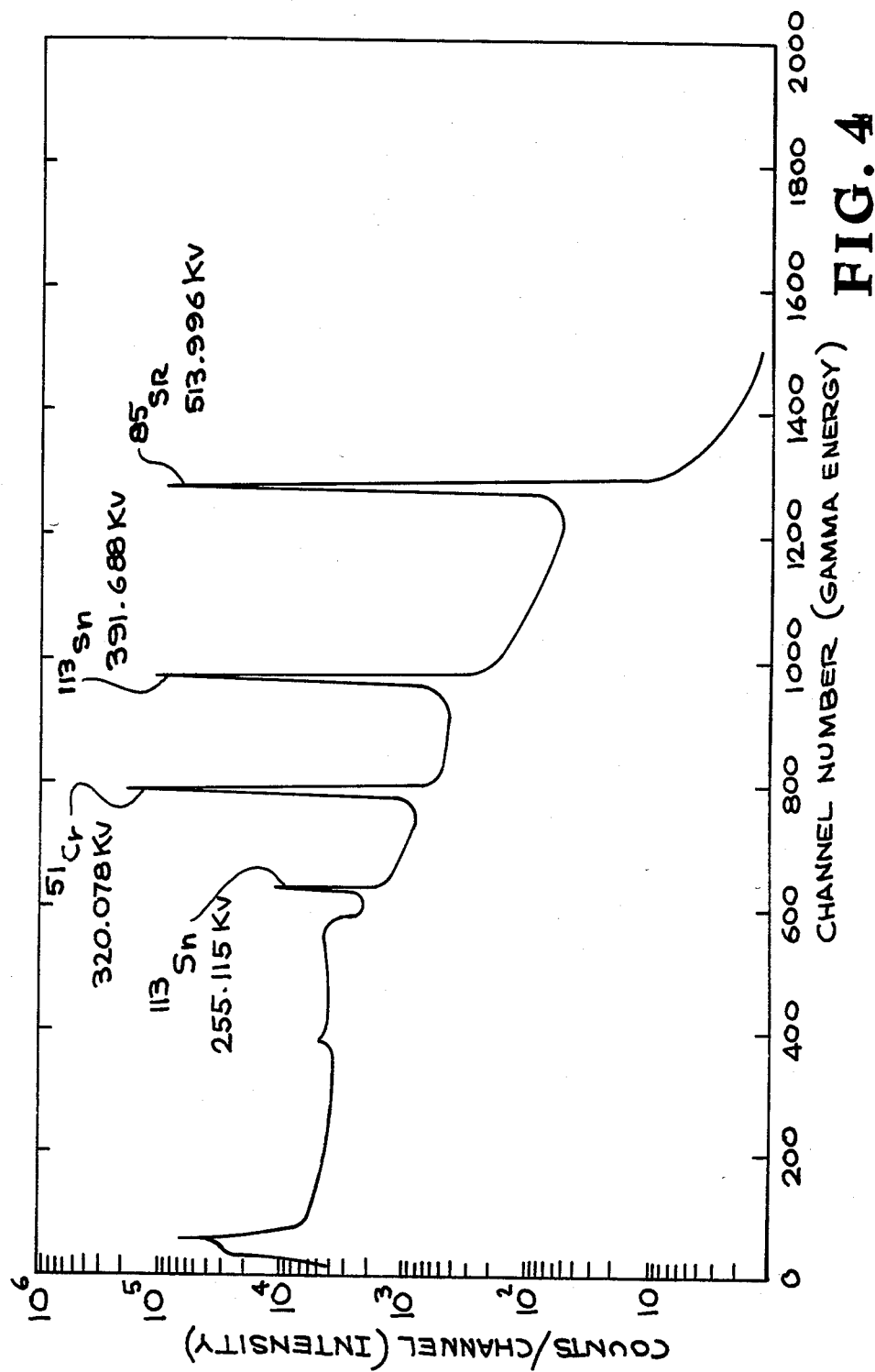
FIG. 4 illustrates the gamma spectrum of a plurality of radioisotopes comprising $^{51}Cr$, $^{85}Sr$, and $^{113}Sn$.

The following plurality is disposed on an integrated circuit: 0.2 $\mu$Ci of $^{51}$Cr($T_{1/2}$=27 days), 0.03 $\mu$Ci of $^{85}$Sr($T_{1/2}$=65 days) and 0.02 $\mu$Ci of $^{113}$Sn($T_{1/2}$=115 days). (See FIG. 4 for the gamma spectral distribution.) The majority of the radioactivity from the plurality is derived from the $^{51}$Cr. The remaining radioisotopes, e.g., $^{85}$Sr and $^{113}$Sn have longer half lives and thus can provide a longer time frame for subsequent authentication and dating. Because many of these integrated circuits are packaged together, the level of radioactivity is kept relatively low. For purposes of detecting unauthorized movement, the emission peak of $^{51}$Cr is detected (see FIG. 4). If an attempt is made to shield the discernible signal, the radioactive isotopes contained within the plurality can be replaced or supplemented with others that have higher energy gammas and/or a neutron emitter as recited in the examples. To defeat the plurality would require use of shielding quantities that are unrealistic.

EXAMPLE 4

The theft of crude oil between the well head and refinery is a costly problem in the oil industry. Pipelines surface at numerous points for storage and pumping stations. Pilferage of the crude can occur at these points. A plurality of radioisotopes is disposed in the crude in order to identify, authenticate and date, and well as detect the unauthorized movement of the fluid. The plurality comprises: $^{57}$Ni($T_{1/2}$=36 hours), $^{51}$Cr($T_{1/2}$=27 days) and $^{22}$Na($T_{1/2}$=2.6 years). Depending upon the event to be detected, e.g., detection of unauthorized movement, authentication of the crude at a much later date, etc., the relative amounts of these three radioisotopes is varied. ($C_5H_5NiCO$)$_2$ is the source of Ni, and $C_4H_4SCr(CO)_3$ is the source of Cr.

EXAMPLE 5

To thwart a sophisticated thief, a neutron emitter such as $^{252}$Cf is mixed with a plurality of gamma emitters such as those listed in examples 1, 2 or 3. $^{252}$Cf emits 6-MeV gammas as well as spontaneous fission neutrons and thus requires massive metallic shielding to attenuate the gamma rays, and hydrogeneous shielding greater than 12 inches thick in a form such as water, polyethylene, or paraffin to degrade and absorb the energetic neutrons present.

The foregoing description of preferred embodiments of the invention has been presented for purposes of illustration and description. It is not intended to be exhaustive or to limit the invention to the precise form disclosed, and obviously many modifications and variations are possible in the light of the above teaching. The embodiment is chosen and described in order to best explain the principles of the invention and its practical application, to thereby enable others skilled in the art to best utilize the invention in various embodiments, and with various modifications that are suited to the particular use contemplated. It is intended that the scope of the invention be defined by the claims appended hereto.

We claim:

1. A method for identifying, authenticating and detecting unauthorized movement of one or more electronic components, comprising:

disposing a predetermined amount of an initially disposed radioactivity from a plurality of radioisotopes on said article, said plurality of radioisotopes having an identifiable characteristic gamma spectrum unique to said plurality comprising a two-tier gamma spectrum having a majority of initially disposed radioactivity possessing a shorter total half-life than a total half-life of a remaining minority of said initialy disposed radioactivity;

providing means for detecting said characteristic gamma spectrum, said detecting means emitting a discernible signal responsive to unauthorized movement of said article; and detecting such characteristic gamma spectrum in responce to said movement at initial times and subsequent times.

2. The method according to claim 1, wherein said plurality of radioisotopes is initially disposed on said article in an amount not exceeding a radioactivity level of about one microcurie.

3. The method according to claim 1, wherein said plurality of radioisotopes is initially disposed on said article in an amount not exceeding a radioactivity level of about 0.5 microcurie.

4. The method according to claim 1, wherein said plurality of radioisotopes is selected from the group consisting of gamma emitters $^{51}$Cr, $^{85}$Sr, $^{113}$Sn, $^{99}$Tc, $^{139}$Ce, $^{22}$Na, and $^{252}$Cf.

5. The method according to claim 1, wherein said plurality of radioisotopes further includes at least one neutron emitter.

6. The method according to claim 1, wherein said plurality of radioisotopes comprises $^{51}$Cr, $^{85}$Sr, and $^{113}$Sn.

7. The method according to claim 1, wherein said plurality of radioisotopes comprises $^{51}$Cr, $^{139}$Ce, and $^{22}$Na.

8. The method according to claim 1, wherein said plurality of radioisotopes comprises $^{57}$Ni, $^{51}$Cr, and $^{22}$Na.

* * * * *